United States Patent [19]

Reith

[11] 4,096,205

[45] Jun. 20, 1978

[54] METHOD TO PRODUCE IMPROVED RUBBER-MODIFIED STYRENE POLYMER

[75] Inventor: Robert A. Reith, Glen Ellyn, Ill.

[73] Assignee: Standard Oil Company (Indiana), Chicago, Ill.

[21] Appl. No.: 609,003

[22] Filed: Aug. 29, 1975

[51] Int. Cl.² .................................. C08F 279/02
[52] U.S. Cl. .................................. 260/880 R
[58] Field of Search ............ 260/83.7, 880 R, 880 B

[56] References Cited

U.S. PATENT DOCUMENTS

| | | | |
|---|---|---|---|
| 3,094,512 | 6/1963 | Short | 260/880 B |
| 3,344,205 | 9/1967 | Grey | 260/880 B |
| 3,402,159 | 9/1968 | Hsieh | 260/83.7 |
| 3,703,567 | 11/1972 | Sutter | 260/83.7 |
| 3,780,139 | 12/1973 | Sutter | 260/83.7 |
| 3,868,434 | 2/1975 | Westphal | 260/880 R |
| 3,929,936 | 12/1975 | Davies | 260/880 B |
| 3,976,721 | 8/1976 | Satake | 260/880 B |

*Primary Examiner*—Paul R. Michl
*Attorney, Agent, or Firm*—Stephen L. Hensley; Arthur G. Gilkes; William T. McClain

[57] ABSTRACT

An improved process for producing an ultra high impact rubber-modified styrene polymer comprises mass polymerizing, substantially without inert solvent, styrene monomer and a styrene-butadiene copolymer rubber containing from 8 to 12 weight percent styrene having a solution viscosity ranging from 20 to 60 cps.

8 Claims, No Drawings

METHOD TO PRODUCE IMPROVED RUBBER-MODIFIED STYRENE POLYMER

BACKGROUND OF THE INVENTION

This invention relates to a process for producing ultra high impact rubber-modified styrene polymers by substantially solventless mass polymerization.

There is a need for an ultra high impact styrene polymer having a ¼ inch specimen Izod impact of at least 4 ft-lbs/inch of notch and melt flow rate (MFR) of at least 3 grams/10 minutes. Such a product would fill a gap between conventional rubber-modified polystyrene having an Izod in the range of 1 to 2 and a more expensive impact acrylonitrile-butadiene-styrene polymer. In these conventional impact resistant styrene polymers, the reinforcing agents usually employed are polybutadiene (PBD) and styrene-butadiene random copolymer (SBR) rubber. Such an ultra high impact styrene polymer product of my invention is useful especially in injection molding applications.

SUMMARY OF THE INVENTION

My invention comprises an improved process for producing rubber-modified styrene polymer, wherein (a) a polymerization feedstock is formed comprising an effective amount up to 30 weight percent of a rubber in styrene monomer in the substantial absence of inert solvent, (b) such feedstock is polymerized with agitation under free radical conditions and (c) the resulting polymer is devolatilized, in which process said rubber comprises s styrene-butadiene copolymer rubber having a solution viscosity ranging from 20 to 60 cps and containing from 8 to 12 weight percent bound styrene with at least 2 weight percent of such styrene in block segments, whereby the resulting rubber-modified styrene polymer has an Izod value of at least 4 ft-lbs/inch of notch and a melt flow rate of at least 3 grams/10 minutes.

BRIEF DESCRIPTION OF THE INVENTION

I have discovered that in a substantially solventless mass polymerization process, incorporation of up to 30 wt. % and preferably from 12 to 25 wt. % of a rubber characterized as a styrene-butadiene copolymer with solution viscosity (5% in styrene) ranging from 20 to 60 cps, typically from 25 to 45 cps and preferably about 30 cps, containing from 8 to 12 wt. %, typically from 9 to 11.5 wt.% and preferably about 10 wt. %, bound styrene with at least 2% of the styrene in block segments and preferably about equal amounts of styrene in random and block arrangements, produces a superior ultra high impact styrene polymer having an Izod value greater than 4 ft-lbs/inch of notch and a melt flow rate greater than 3 g./10 min. A preferable rubber is a two-block copolymer. A suitable rubber useful in my invention is Firestone Stereon 720. Typical characteristics of such a rubber are given in Table I.

TABLE I

| | |
|---|---|
| Volatile matter, wt % | 0.75 max. |
| Ash, wt % | 0.20 max. |
| Organic acid, wt % | nil |
| Soap, wt % | nil |
| APHA color | 10 max |
| Solution viscosity (5% in styrene), cps | 25–45 |
| Dissolving time (25° C), hours | 2 max. |
| Mooney viscosity (ML-4 at 212° F) | 30–40 |
| Williams plasticity, $Y_3$ mm at rm temp | 3.5 min. |
| Williams recovery, $R_1$ mm at rm temp | 1.5 min. |
| Inherent viscosity, (DSV) | 1.3–1.5 |

TABLE I-continued

| | |
|---|---|
| Bound styrene, wt % | 9.0–11.5 |
| Block styrene, wt % | 2.0 min. |
| Glass transition temp. ° C (Tg) | −92 |
| Refractive index | 1.5249 |
| Specific gravity, 25°/25° C | 0.91 |
| $\overline{M}w$ | 185,000 |
| $\overline{M}n$ | 83,000 |
| $\overline{M}w/\overline{M}n$ | 2.2 |

Generally, the impact resistance of polystyrene, as measured by the Izod impact test, increases as the rubber in the polymer is increased. However, increasing the rubber level to increase the impact resistance of the product is not as simple or straightforward as it might appear. As the rubber level in the polymerization feedstock is increased, the longer it takes to dissolve, while the resulting increased viscous feedstock is more difficult to pump. During the polymerization itself, the higher the rubber level in the feed, the later phase inversion occurs and the more difficult it is to disperse the rubber. This is especially significant in a continuous mass thermal commercial process where agitation capabilities are limited. Usually, the more rubber used to make the product the more the melt flow rate of the resin is decreased. Chain transfer agents used in the feedstock to lower the molecular weight of the matrix and increase the product melt flow rate also make the rubber more difficult to disperse leading to larger rubber phase particles for a given degree of agitation.

Surprisingly, using the method of our invention, a high level of rubber can be used while maintaining a high melt flow rate. Compared to conventional rubbers used to prepare impact styrene polymers, such a rubber as described above undergoes a rapid and well-defined phase inversion and disperses into very small particles using minimum agitation, even with relatively high feedstock levels of chain transfer agent needed to achieve the melt flow rates required in injection molding applications. Further, the ultra high impact polymers of my invention show improved gloss characteristics.

My ultra high impact styrene polymer is prepared by a substantially solventless mass thermal process under free radical conditions. Although contaminants in the styrene monomer, such as ethylbenzene, can be built up by recycle, (e.g., up to about 6%), this process substantially is free of inert solvent. Although normally polymerization is initiated thermally, suitable free radical initiators can be used.

After the polymerization begins, the system separates into two phases. Initially, the rubber in styrene is present in the larger amount and is the major or continuous phase. As the reaction proceeds and more polystyrene is formed, a phase inversion occurs whereupon the polystyrene in styrene becomes the continuous phase. At the phase inversion point the system must be agitated sufficiently to disperse the polystryene-grafted rubber phase into roughly spherical particles which act to reinforce an otherwise brittle polystryene matrix. The polymerization can be conducted in multiple stages with increasing temperature and decreasing agitation. Typically polymerization takes from 6 to 9 hours at a temperature ranging from 120° to 210° C. After polymerization, the product can be devolatilized to remove unreacted monomer.

Advantageously, chain transfer agents are present during polymerization in effective amounts up to 5000 ppm, however a balance must be met between impact strength and melt flow rate. The chain transfer agent t-dodecyl mercaptan at about 400 ppm with a 20% rubber level produced a product having suitable Izod impact strength and melt flow rates. About 1500 ppm of the less active chain transfer agent, 1,4-dihydronaphthalene produced a suitable polymeric product. If the amount of rubber is decreased, the amount of chain transfer agent can be decreased.

In addition to styrene monomer and rubber, up to 10% of other materials can be included in the polymerization feedstock such as stabilizers, antioxidants, colorants, flame retardants and lubricants.

That the superior results of the present invention cannot be solely attributed to low solution viscosity is demonstrated by comparison of rubber-modified styrene polymers using other low solution viscosity rubbers. For example, in producing a rubber-modified styrene polymer, the high cis PBD rubber Polysar Taktene 1202 having a solution viscosity of about 60 cps, is not readily dispersed and does not undergo as much grafting as other PBD rubbers containing higher vinyl unsaturation. The resulting product contained larger rubber particles and lower Izod values, melt flow rate and tensile strength than products similarly produced using the method of this invention.

Although Firestone SR-5998 PBD rubber having a solution viscosity of about 60 cps dispersed into smaller particles than Taktene 1202, styrene polymers containing 20% of this rubber had lower than expected Izod values. A special low viscosity (SLV) Taktene 1202 (solution viscosity of about 25 cps) disperses into smaller particles, but still does not impart the same level of impact strength as does the rubbers of the present invention.

Phillips' Solprene 1205, a low solution viscosity (11 cps) SBR rubber containing 25% styrene either fails to undergo phase inversion or results in a product having very small particles resulting in poor Izod impact strengths. It appears that, in spite of its low solution viscosity, this rubber cannot be dispersed uniformly at a 20% level in the presence of a chain transfer agent to yield an injection molding grade ultra high impact styrene polymer.

It could be speculated that the difference in the performance of the rubber useful in this invention and the PBD rubbers is related to the morphology of the rubber particles in the final product. Transmission electron photomicrographs of impact polystrene prepared with a range of rubber levels were examined. It appears that as the level of rubber added to the feedstock is increased there is a decrease in the size of the occluded polystyrene regions within the rubber particles of the final product. However, the thickness of the rubber membrane walls surrounding the polystyrene occlusions is about the same for each level examined. This means there is a greater amount of rubber per unit volume within the particles of products made with higher levels of rubber. All other factors being equal, this might result in less efficient use of the rubber and account for lower than expected Izod impact strength. However, products made with high levels of either Taktene 1202 or Stereon 720 seem to have the same type of rubber structure regardless of their Izod impact strength. Therefore, other factors or combination of factors such as particles size and the degree of grafting and crosslinking of the rubber phase may account for the differences in their performance characteristics.

In order to demonstrate my invention a series of polymerization reaction were conducted in a one-half gallon Chemco stainless steel reactor fitted with a valve through which molten polymer can be withdrawn, a four blade agitator and an internal cooling coil. A feedstock comprising styrene monomer, rubber, 3% USP 35 mineral oil and 0.2% BHT were polymerized in this apparatus with agitation for about 6 to 9 hours during which time the temperature increased from about 120° to 210° C. Hard polymer containing from 2 to 5% residual monomer was devolatilized in a Brabender ¾ inch vented extruder. The results of my experiments are shown in Table II.

It is apparent from the above examples that using the teachings of my invention an ultra high impact styrene polymer with an Izod impact resistance of at least 4 ft-lbs/in. of notch and a melt flow rate of at least 3 g./10 min. can be produced in a substantially solventless mass thermal polymerization process.

TABLE II

| Ex. (Run) | Rubber Type | Rubber (wt %) | Chain Agent | Transfer (ppm)[1] | Solution Viscosity of Rubber (5% in Styrene, cps) | Elongation (%) | Yield Tensile Strength (psi) | Ultimate Tensile Strength (psi) | Izod (ft-lb/in of notch) | MFR (g/10 min) | HDT (¼F.) |
|---|---|---|---|---|---|---|---|---|---|---|---|
| (A) | Stereon 720 | 20 | 1000 | (TDM) | ca. 30 | 28 | 2320 | 1970 | 1.8 | 6.5 | 164 |
| (B) | Stereon 720 | 20 | 600 | (TDM) | ca. 30 | 45 | 3270 | 2820 | 3.4 | 4.2 | 171 |
| I | Stereon 720 | 20 | 400 | (TDM) | ca. 30 | 43 | 2480 | 2140 | 4.1 | 4.1 | 164 |
| II | Stereon 720 | 20 | 1500 | (DHN) | ca. 30 | 26 | 2530 | 2190 | 4.2 | 4.5 | 172 |
| (C) | Stereon 720 | 15 | 300 | (TDM) | ca. 30 | 39 | 2640 | 2260 | 3.0 | 4.9 | 170 |
| III | Stereon 720 | 15 | 300 | (NDM) | ca. 30 | 39 | 2720 | 2000 | 4.1 | 3.1 | 173 |
| (D) | Taktene 1202 | 20 | 600 | (TDM) | ca. 60 | >50 | 1340 | 1290 | 2.5 | 4.3 | 171 |
| (E) | Taktene 1202 | 20 | 400 | (TDM) | ca. 60 | >50 | 1410 | 1520 | 3.6 | 1.9 | 169 |
| (F) | Taktene 1202 | 20 | none | — | | 36 | 2260 | 1990 | 6.0 | 0.7 | 172 |
| (G) | SLV Taktene 1202 | 20 | 600 | (TDM) | ca. 25 | >50 | 1480 | 1330 | 2.9 | 5.4 | 163 |
| (H) | Firestone SR 5998 | 20 | 600 | (TDM) | ca. 60 | >50 | 1550 | 1430 | 2.8 | 4.2 | 163 |
| (I) | Solprene 1205 | 20 | 300 | (NDM) | 11 | 49 | 3550 | 3070 | 4.6 | 0.3 | 173 |
| (J) | Solprene 1205 | 20 | 600 | (TDM) | 11 | 25 | 3460 | 2600 | 0.8 | 2.0 | 172 |
| (K) | Solprene 1205 | 20 | 1500 | (DHN) | 11 | 24 | 3250 | 2520 | 0.7 | 2.0 | 170 |

TABLE II-continued

| Ex. (Run) | Rubber Type | Rubber (wt %) | Chain Agent | Transfer (ppm)[1] | Solution Viscosity of Rubber (5% in Styrene, cps) | Elong-ation (%) | Yield Tensile Strength (psi) | Ultimate Tensile Strength (psi) | Izod (ft-lb/in of notch) | MFR (g/10 min) | HDT (¼F.) |
|---|---|---|---|---|---|---|---|---|---|---|---|
| | 1205 | | | | | | | | | | |

[1] TDM = t-dodecyl mercaptan
NDM = n-dodecyl mercaptan
DHN = 1,4-dihydronaphthalene

I claim:

1. In a process for producing rubber-modified styrene polymer, wherein (a) a polymerization feedstock is formed comprising an effective amount up to 30 weight percent of a rubber in styrene monomer in the substantial absence of inert solvent, (b) such feedstock is polymerized with agitation under free radical conditions and (c) the resulting polymer is devolatilized, the improvement wherein said rubber comprises a styrene-butadiene copolymer rubber having a solution viscosity ranging from 20 to 60 cps and containing from 8 to 12 weight percent bound styrene with at least 2 percent, by weight of the rubber, of such styrene in block segments and about equal amounts of styrene in block and random segments, whereby the resulting rubber-modified styrene polymer has an Izod value of at least 4 ft.-lbs./inch of notch and a melt flow rate of at least 3 grams/10 minutes.

2. The improvement of claim 1 wherein the polymerization feedstock contains from 12 to 25 weight percent rubber.

3. The improvement of claim 2 wherein the feedstock contains an effective amount of a chain transfer agent.

4. The improvement of claim 3 wherein the rubber has a solution viscosity ranging from 25 to 45 cps.

5. The improvement of claim 4 wherein the rubber contains from 9 to 11 weight percent styrene.

6. The improvement of claim 4 wherein the rubber contains about 10 weight percent styrene and has a solution viscosity about 30 cps.

7. The product obtained using the improved process of claim 1.

8. The product obtained using the improved process of claim 6.

* * * * *